United States Patent [19]

Wenzel et al.

[11] 3,984,329

[45] Oct. 5, 1976

[54] DEVICE FOR EXTRACTING LIQUID FROM SLUDGE

[76] Inventors: Lothar Wenzel, Ostendstrasse 36, 7532 Niefern; Ulrich Kollmar, Auf dem Berg 17, 753 Pforzheim-Wurm, both of Germany

[22] Filed: Feb. 25, 1975

[21] Appl. No.: 552,749

[30] Foreign Application Priority Data

Feb. 27, 1974 Germany............................ 2409269

[52] U.S. Cl. .................................. 210/396; 210/400
[51] Int. Cl.² ............................................ B01D 33/36
[58] Field of Search ........... 210/386, 396, 400, 456

[56] References Cited
UNITED STATES PATENTS

| | | |
|---|---|---|
| 2,097,529 | 11/1937 | Nordell .......................... 210/396 X |
| 3,531,404 | 9/1970 | Goodman et al. ............... 210/400 X |
| 3,873,450 | 3/1975 | Lovegreen ........................ 210/400 |
| 3,891,549 | 6/1975 | Carmel et al. .................. 210/400 X |

Primary Examiner—Theodore A. Granger

[57] ABSTRACT

A conveyor-type sludge filtering device for extracting the liquid component from the sludge, the device including a horizontally moving supported strand of a perforate endless conveyor belt onto which a continuous flow of sludge is deposited, while rows of flow breaker members extend downwardly into the moving sludge, thereby preventing the formation of sludge layers, especially of a belt-plugging bottom layer of solid matter. The flow breakers are preferably wedge-shaped and pivotably supported on transverse rods.

7 Claims, 5 Drawing Figures

DEVICE FOR EXTRACTING LIQUID FROM SLUDGE

BACKGROUND OF THE INVENTION

1. Field of the Invention

The present invention relates to devices for separating the liquid component from suspensions or sludges, and more particularly to sludge filtering devices in which the liquid component is extracted from such solid materials as fibers, colloids, and the like, as the suspension or sludge is deposited onto a moving perforate conveyor belt which acts as a filter. Devices of this type are particularly useful in connection with the treatment of sewage sludge. However, similar devices may also find application in the paper making industry or in the chemical industry, where the liquid component of a suspension or sludge preparation is to be removed in a continuous operation.

2. Description of the Prior Art

The treatment of sewage sludge has evolved from the previously purely physical separation of its liquid and solid components to prior chemical treatment of the sludge with various conditioning agents, such as the colloid producing poly-acrylamides. This treatment results in a precipitation effect which is similar to the transformation of milk, when it turns sour, thus permitting the separation of the water component from the now colloidal sewage.

The use of perforate conveyor belts for filtering purposes is known in the prior art. In cases where more than just a moderate filtering efficiency is called for, such filtering conveyors are usually combined with more complex filter press installations where the suspension is confined between two spaced perforate conveyor belts and pressure is applied to these belts by means of rollers.

It is further known from the prior art that the filtering efficiency of perforate conveyor belts can be improved by supplementing the gravity effect and/or the roller pressure with a vacuum which is applied to the liquid exit side of the perforate conveyor belt. However, the arrangement of such vacuum boxes under the conveyor belts tends to increase the energy consumption, not only because a vacuum pump is needed, but also because the belt friction is increased. On the other hand, when a perforate belt becomes plugged with solid matter, even the application of vacuum underneath it fails to produce satisfactory extraction of liquid from the sludge.

It has therefore already been suggested in the prior art to counteract the plugging of the perforate conveyor belt, by providing scraping elements which are to remove the deposited solid matter from the surface of the conveyor belt, in order to allow the liquid to reach the belt perforations. One such prior art device is disclosed in U.S. Pat. No. 2,097,529. Here, groups of transversely extending inclined scraper baffles ride on the conveyor belt under the influence of gravity, thereby lifting the heavier solid matter from the belt and forcing it to psss over the baffle elements. The same prior art device further suggests the arrangement of counter-rotating beaters with scraping blades which similarly lift the solid matter from the surface of the conveyor belt. While the rotating beaters require a drive train for their operation and confinement of the sludge on all sides because of splashing, the inclined scrapers which ride on the conveyor belt tend to produce wear on the latter, or they may become stuck in their guides so as to become ineffective.

SUMMARY OF THE INVENTION

Underlying the present invention is the primary onjective of providing an improved sludge filtering conveyor for the removal of the liquid component from sludge or other suspensions, without the shortcomings of prior art solutions which involve complex machinery and increased energy consumption and/or conveyor belt wear.

In order to attain this onjective, the present invention suggests a filtering device with a substantially horizontal conveyor belt strand onto which the sludge is deposited as a sludge bed, and which, as it moves along, encounters a series of laterally and longitudinally spaced flow breakers, whose purpose it is to prevent the formation of solid material layers in the sludge which would prevent the liquid from flowing downwardly toward and through the perforate conveyor belt. These flow breakers may be either stationary, or they may be in motion, moving either against the sludge flow or transversely.

In the course of testing various embodiments of the present invention, it has further been discovered that the moderate turbulence which is being created by the flow breakers enhances the floculation action of the chemical additives, thereby further improving the desired precipitation of the sewage component. Because the proposed flow breakers preferably reach almost to the surface of the conveyor belt, they also tend to prevent the formation of a solid bottom layer which might prematurely plug up the perforations of the conveyor belt.

BRIEF DESCRIPTION OF THE DRAWINGS

Further special features and advantages of the invention will become apparent from the description following below, when taken together with the accompanying drawing which illustrates, by way of example, several embodiments of the invention, represented in the various figures as follows.

DESCRIPTION OF THE PREFERRED EMBODIMENTS

Figure 1:
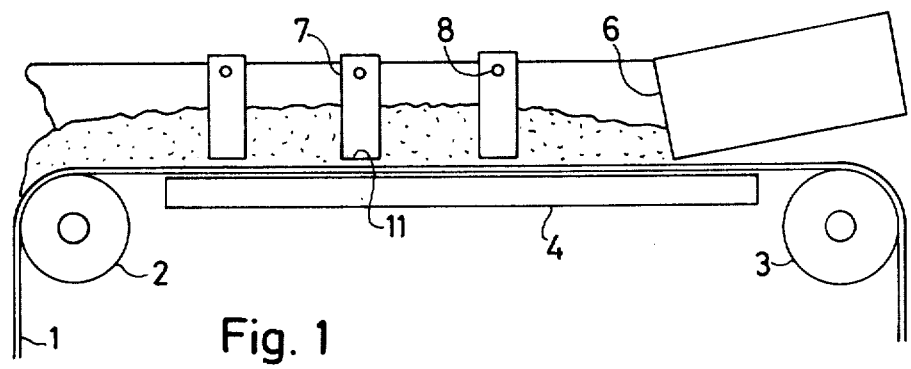
FIG. 1 shows in a somewhat simplified elevational view a device embodying the invention.

The device of the invention, as illustrated in the drawings consists essentially of an endless perforate conveyor belt 1 which runs over two or more conveyor guide drums 2 and 3, in a substantially horizontal conveyor run. A sludge discharge unit 6, arranged approximately above the conveyor guide drum 3, dispenses a continuous layer of sludge 5 onto the upper surface of the conveyor belt 1, which latter carries the sludge 5 away from the discharge unit 6.

The major portion of the horizontal belt run is supported by a guide table 4. This table, while supporting the perforate conveyor belt 1, is itself pervious to liquid, permitting the downward discharge of the liquid component of the sludge through gravity, as it passes through the perforate conveyor belt 1. For this purpose, the upper surface of the guide table is preferably provided with longitudinal grooves and rows of vertical passages leading from these grooves to the underside of the table 4, or the table may be provided with a series of longitudinal slots in the manner of a flow grate.

Figure 2:
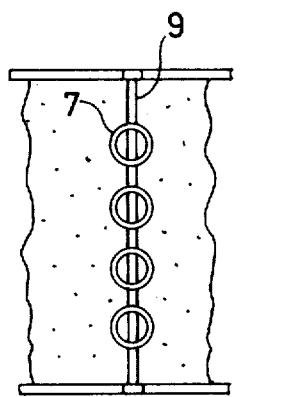
FIG. 2 shows a portion of the device of FIG. 1 in a plan view.

As the sludge or suspension 5 advances away from the discharge unit 6, it encounters several successive transverse rows of flow breakers 7 which are arranged above the conveyor belt 1 in the flow path of the sludge 5. As can be seen in FIGS. 1 and 2, these flow breakers 7 are in the form of short tubes which are laterally spaced from each other, thereby forcing the sludge flow to pass between the flow breakers 7. Each row of flow brakers 7 is supported by a transverse rod 9 engaging appropriate bores 8 in the upper extremity of the flow breakers 7. The bottom end of each flow breaker is preferably open. Successive rows of flow breakers 7 are advantageously staggered in the manner illustrated in FIG. 3, thereby preventing the formation of layers in the sludge, especially the formation of a deposit of solid material on the surface of the conveyor belt 1 which would tend to plug the perforations of the latter. This obstacle course in the sludge flow has the additional advantage of producing a moderate agitation of the sludge, thereby facilitating the downward passage of the liquid component toward the conveyor belt 1 and, in the case of sewage sludge, also producing an advantageous increase in the floculation action which causes the sewage components to precipitate as colloids, so that the remaining liquid is essentially water.

In their simplest form the flow breakers 7 may be stationary obstacles. Alternatively, they may be arranged to pivot around their supporting rods 9, thereby making it possible for heavy accumulations of fibers to pass under the flow breakers, rather than bunching in front of them and thereby damming up the flow. Alternatively, the flow breakers 7 may be positioned at a fixed inclination, with their upper ends positioned further downstream than their lower ends, thereby producing a vertical motion component in the sludge flow which tends to lift solid materials, and especially fibers, to the surface of the sludge flow. The bottom ends 11 of the flow breakers 7 are preferably spaced a small distance from the perforate conveyor belt 1 so that the latter is not subject to wear.

Figure 3:
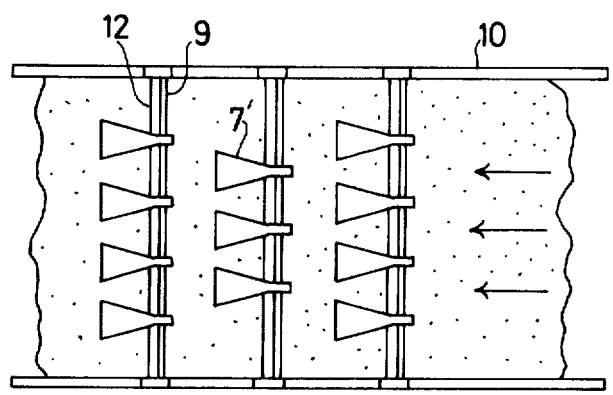
FIG. 3 is a partial plan view of a modified embodiment of the invention with specially shaped flow breakers.
Figure 4:
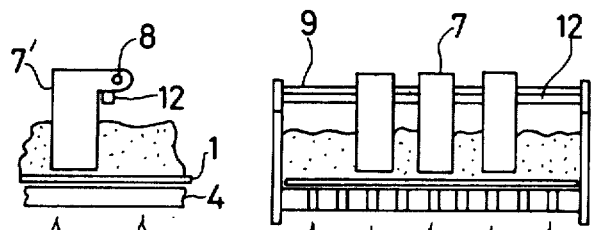
FIG. 4 shows one of the flow breakers of FIG. 3 as seen in elevation.
Figure 5:
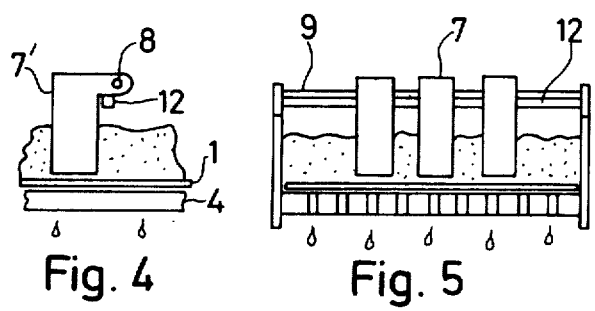
FIG. 5 is a transverse cross section through the device of FIG. 1.

In FIGS. 3 and 4 is illustrated a modified embodiment of the invention, featuring flow breakers 7' of a special shape. These flow breakers have the general shape of a triangular prism or long wedge, the cross-sectional profile being preferably a slender isosceles triangle whose point faces upstream as a leading edge. The bore 8 for the supporting rod 9 is provided in an overhanging nose-like extension 12 on the leading edge. The resulting offset pivot point gives the flow breaker a tendency to bear downwardly toward the conveyor belt 1, its downward motion being preferably limited by an abutment rod 13. Thus, the flow breakers 7' will normally remain in their abutted position, but will swing away upwardly, should an accumulation of solid matter necessitate such a motion. For this purpose, the flow breakers 7' of FIGS. 3 and 4 may be hollow, or they may be made of wood or some other light weight material which will be lifted by the sludge flow, should the latter reach a higher than normal level.

Of course, the leading edge of the modified flow breakers 7' need not be vertical. It may be inclined against the sludge flow, as was mentioned in connection with the tubular flow breakers, in which case the sludge flow will exert a certain downward component on the flow breakers which will decrease the upward pivoting tendency of the sludge flow against the flow breakers.

The lateral and longitudinal spacing between the flow breakers of a row and successive rows of flow breakers will of course have to be adapted to the specific characteristics of the suspension or sludge to be filtered. It may also be desirable to provide successive rows of flow breakers with different lateral spacing and/or progressively more slender cross-sectional profiles, as the suspension or sludge becomes progressively more viscous.

It should be understood, of course, that the foregoing disclosure describes only preferred embodiments of the invention and that it is intended to cover all changes and modifications of these examples of the invention which fall within the scope of the appended claims.

We claim the following:

1. In a device for extracting liquid from a suspension or sludge, the combination comprising:
   a continuously advancing endless perforate conveyor belt having a substantially horizontally extending belt strand;
   a guide means for supporting the horizontal conveyor belt strand from the underneath, said guide means being pervious to liquid;
   means for depositing onto the advancing conveyor belt strand a continuous bed of suspension or sludge;
   walls for laterally retaining said suspension or sludge bed on the advancing conveyor belt strand, as its liquid component progressively passes downwardly through the belt and guide means; and
   at least two successive rows of downwardly pointing flow breakers arranged above the horizontal conveyor belt strand so as to extend into the moving sludge bed, thereby disturbing the sludge flow and preventing the premature formation of a layer of solid material immediately above the conveyor belt strand; and wherein
   each row of flow breakers is carried by a transversely extending supporting rod which is mounted in the lateral retaining walls;
   the supporting rods and associated flow breakers define a transverse pivot axis for the flow brakers at a level above the normal level of the sludge; and
   the flow breakers are subjected to an angular biasing force urging them into a normal operating position against the movement of the sludge bed on the conveyor.

2. A combination as defined in claim 1, wherein the flow breakers are upright elongated members of generally cylindrical shape.

3. A combination as defined in claim 1, wherein the flow breakers are elongated members facing the sludge flow with the leading edges which are inclined so that the lower member extremities are further upstream than the upper member extremities, thereby tending to raise solid matter, especially fibrous solid matter from the bottom layer of the flowing sludge to a higher flow level.

4. A combination as defined in claim 1, wherein the rows of flow breakers are laterally staggered so that the gaps between the members of one row are faced by flow breaker members of the next row.

5. A combination as defined in claim 1, wherein the flow breakers define a minimal vertical clearance between their lower extremities and the upper surface of the conveyor belt strand, when the breaker members are positioned in their lowermost pivotal position.

6. A combination as defined in claim 1, wherein the flow breakers are upright elongated members of wedge-shaped cross section which are so oriented that they present a pointed leading edge to the sludge flow.

7. A combination as defined in claim 6, wherein:

each flow breaker has an upper supporting nose extending in the upstream direction from its leading edge;

said pivot axis with the supporting rod is located in said nose; and each row of flow breakers further includes an abutment rod engaging the flow breakers of the row, so as to define their lowermost angular position against said angular biasing force, while permitting each member to be pivoted upwardly about said pivot axis, when it encounters an accumulation of solid matter in the sludge flow.

* * * * *

REEXAMINATION CERTIFICATE (569th)
United States Patent [19]
Wenzel et al.

[11] B1 3,984,329
[45] Certificate Issued  Sep. 23, 1986

[54] DEVICE FOR EXTRACTING LIQUID FROM SLUDGE

[75] Inventors: Lothar Wenzel, Niefern; Ulrich Kollmar, Pforzheim-Wurm, both of Fed. Rep. of Germany

[73] Assignee: Firma Gebruder Bellmer KG, Maschinenfabrik, Niefern, Fed. Rep. of Germany

Reexamination Request:
No. 90/000,759, Apr. 12, 1985

Reexamination Certificate for:
Patent No.: 3,984,329
Issued: Oct. 5, 1976
Appl. No.: 552,749
Filed: Feb. 25, 1975

[30] Foreign Application Priority Data

Feb. 27, 1974 [DE] Fed. Rep. of Germany ....... 2409269

[51] Int. Cl.⁴ ............................................. B01D 33/36
[52] U.S. Cl. ..................... 210/396; 210/400
[58] Field of Search ................ 210/386, 396, 400, 456

[56] References Cited

U.S. PATENT DOCUMENTS

| | | | |
|---|---|---|---|
| 712,347 | 10/1902 | Wheelwright | 210/386 |
| 1,408,279 | 2/1922 | Ewald | 210/400 X |
| 1,682,460 | 8/1928 | Aldrich | 162/311 |
| 1,875,442 | 9/1932 | Greg | 198/499 |
| 2,097,529 | 11/1937 | Nordell | 210/393 |
| 2,308,264 | 1/1943 | Bolton | 210/199 |
| 3,485,377 | 12/1969 | McKenzie et al. | 210/383 |
| 3,865,232 | 2/1975 | Koenig et al. | 198/497 |
| 3,891,549 | 6/1975 | Carmel et al. | 210/400 X |

FOREIGN PATENT DOCUMENTS

| | | |
|---|---|---|
| 38879 | 9/1909 | Austria . |
| 1143790 | 2/1963 | Fed. Rep. of Germany . |
| 1575879 | 7/1969 | France . |
| 2180049 | 11/1973 | France . |
| 29-4138 | 7/1954 | Japan . |
| 64098 | 12/1928 | Sweden . |
| 79786 | 8/1932 | Sweden . |
| 88565 | 2/1937 | Sweden . |
| 365122 | of 0000 | Sweden . |
| 491735 | 9/1938 | United Kingdom . |
| 1145135 | 3/1969 | United Kingdom . |

OTHER PUBLICATIONS

*Plane Filters,* Humbolt Wedag Company, 1971.

*Primary Examiner*—Richard V. Fisher

[57] ABSTRACT

A conveyor-type sludge filtering device for extracting the liquid component from the sludge, the device including a horizontally moving supported strand of a perforate endless conveyor belt onto which a continuous flow of sludge is deposited, while rows of flow breaker members extend downwardly into the moving sludge, thereby preventing the formation of sludge layers, especially of a belt-plugging bottom layer of solid matter. The flow breakers are preferably wedge-shaped and pivotably supported on transverse rods.

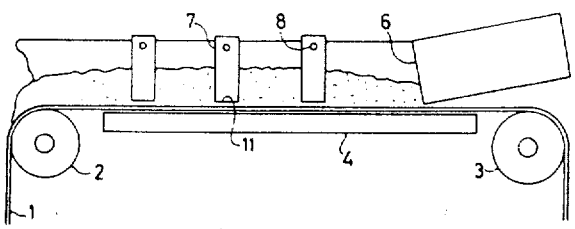

ic
REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

The drawing figures have been changed as follows: In figure 3, reference numeral 12 has been changed to 13; and in figure 4, reference numeral 12 has been changed to 13 and a new reference numeral 12 has been added.

AS A RESULT OF REEXAMINATION, IT HAS BEEN DETERMINED THAT:

The patentability of claims 6 and 7 is confirmed.

Claims 1-5 are cancelled.

New claims 8-38 are added and determined to be patentable.

8. In a device for extracting liquid from a suspension or sludge, the combination comprising:
 a continuously advancing endless perforate conveyer belt having a substantially horizontally extending belt strand;
 guide means for supporting the horizontal conveyor belt strand from underneath, said guide means being pervious to liquid;
 means for depositing onto the advancing conveyor belt strand a continuous bed of suspension or sludge;
 walls for laterally retaining said suspension or sludge bed on the advancing conveyor belt strand, as its liquid component progressively passes downwardly through the belt and guide means;
 at least two successive rows of downwardly pointing flow breakers arranged above the horizontal conveyor belt strand so as to extend into the moving sludge bed, thereby disturbing the sludge flow and preventing the premature formation of a layer of solid material immediately above the conveyor belt strand; and
 means for effecting upward swinging of the flow breakers during normal operation in response to impingement of solid matter on the flow breakers to permit the solid matter to move past the flow breakers; and wherein each row of flow breakers is carried by a transversely extending supporting rod which is mounted in the lateral retaining walls;
 the upward swinging means includes a transverse pivot axis for the flow breakers at a level above the normal level of the sludge and about which the flow breakers are swingable, the transverse pivot axis being defined by the supporting rods and associated flow breakers; and
 the flow breakers are subjected to an angular biasing force urging them into a normal operating position against the movement of the sludge bed on the conveyor.

9. A combination as defined in claim 8 including means for effecting independent pivoting of each flow breaker about the transverse pivot axis during operation by arranging each flow breaker to pivot about its supporting rod independently of the other flow breakers on the same supporting rod.

10. A combination as defined in claim 8 including an extension between at least part of each flow breaker and its supporting rod to provide an offset pivot which contributes to the angular biasing force.

11. A combination as defined in claim 8, wherein said angular biasing is achieved by at least part of each flow breaker being in overhanging relationship with its supporting rod to provide an offset pivot arrangement.

12. A combination as defined in claim 8, wherein the flow breakers are upright elongated members of generally cylindrical shape.

13. A combination as defined in claim 8, wherein the flow breakers are elongated members facing the sludge flow with the leading edges which are inclined so that the lower member extremities are further upstream than the upper member extremities, thereby tending to raise solid matter, especially fibrous solid matter from the bottom layer of the flowing sludge to a higher flow level.

14. A combination as defined in claim 8, wherein the rows of flow breakers are laterally staggered so that the gaps between the members of one row are faced by flow breaker members of the next row.

15. A combination as defined in claim 8, wherein the flow breakers define a minimal vertical clearance between their lower extremities and the upper surface of the conveyor belt strand, when the breaker members are positioned in their lowermost pivotal position.

16. A combination as defined in claim 8, wherein the flow breakers are upright elongated members of wedge-shaped cross section which are so oriented that they present a pointed leading edge to the sludge flow.

17. A combination as defined in claim 16, wherein:
 each flow breaker has an upper supporting nose extending in the upstream direction from its leading edge;
 said pivot axis with the supporting rod is located in said nose; and
 each row of flow breakers further includes an abutment rod engaging the flow breakers of the row, so as to define their lowermost angular position against said angular biasing force, while permitting each member to be pivoted upwardly about said pivot axis, when it encounters an accumulation of solid matter in the sludge flow.

18. In a device for extracting liquid from a suspension or sludge, the combination comprising:
 a continuously advancing endless perforate conveyor belt having a substantially horizontally extending belt strand;
 guide means for supporting the horizontal conveyor belt strand from underneath, said guide means being pervious to liquid;
 means for depositing onto the advancing conveyor belt strand a continuous bed of suspension or sludge;
 walls for laterally retaining said suspension or sludge bed on the advancing conveyor belt strand, as its liquid component progressively passes downwardly through the belt and guide means;
 at least two successive rows of downwardly pointing flow breakers arranged above the horizontal conveyor belt strand so as to extend into the moving sludge bed, thereby disturbing the sludge flow and preventing the premature formation of a layer of solid material immediately above the conveyor belt strand; and means for effecting upward swinging of each flow breaker independently of the other flow breakers during normal operation in response to impingement of solid matter on the flow breakers to permit the solid matter to move past the flow breakers; and wherein each row of flow breakers is carried by a transversely extending supporting rod which is mounted in the lateral retaining walls;

the independent upward swinging means includes a transverse pivot axis for the flow breakers at a level above the normal level of the sludge and about which the flow breakers are independently swingable, the transverse pivot axis being defined by the supporting rods and associated flow breakers, the flow breakers of each row being pivotable about their associated supporting rod; and the flow breakers are subjected to an angular biasing force urging them into a normal operating position against the movement of the sludge bed on the conveyor.

19. A combination as defined in claim 18, wherein said angular biasing is achieved by at least part of each flow breaker being in overhanging relationship with its supporting rod to provide an offset pivot arrangement.

20. A combination as defined in claim 18 including an extension between at least part of each flow breaker and its supporting rod to provide an offset pivot which contributes to the angular biasing force.

21. In a device for extracting liquid from a suspension or sludge, the combination comprising:

a continuously advancing endless perforate conveyor belt having a substantially horizontally extending belt strand;

guide means for supporting the horizontal conveyor belt strand from underneath, said guide means being pervious to liquid;

means for depositing onto the advancing conveyor belt strand a continuous bed of suspension or sludge;

walls for laterally retaining said suspension or sludge bed on the advancing conveyor belt strand, as its liquid component progressively passes downwardly through the belt and guide means;

at least two successive rows of downwardly pointing flow breakers arranged above the horizontal conveyor belt strand so as to extend into the moving sludge bed, thereby disturbing the sludge flow and preventing the premature formation of a layer of solid material immediately above the conveyor belt strand; and means for effecting upward swinging of the flow breakers during normal operation in response to impingement of solid matter on the flow breakers to permit the solid matter to move past the flow breakers; and wherein each row of flow breakers is carried by a transversely extending supporting rod which is mounted in the lateral retaining walls;

the supporting rods and associated flow breakers define a transverse pivot axis for the flow breakers at a level above the normal level of the sludge;

the upward swinging means includes the transverse pivot axis defined by the supporting rods and associated flow breakers, the flow breakers being swingable about the transverse pivot axis; and the flow breakers are subjected to an angular biasing force urging them into a normal operating position against the movement of the sludge bed on the conveyor, said angular biasing being achieved by at least part of each flow breaker being in overhanging relationship with its supporting rod to provide an offset pivot arrangement.

22. A combination as defined in claim 21 including means for effecting independent pivoting of each flow breaker about the transverse pivot axis during operation by arranging each flow breaker to pivot about its supporting rod independently of the other flow breakers on the same supporting rod.

23. In a device for extracting liquid from a suspension or sludge, the combination comprising:

a continuously advancing endless perforate conveyor belt having a substantially horizontally extending belt strand;

guide means for supporting the horizontal conveyor belt strand from underneath, said guide means being pervious to liquid;

means for depositing onto the advancing conveyor belt strand a continuous bed of suspension or sludge;

walls for laterally retaining said suspension or sludge bed on the advancing conveyor belt strand, as its liquid component progressively passes downwardly through the belt and guide means; and at least two successive rows of downwardly pointing flow breakers arranged above the horizontal conveyor belt strand so as to extend into the moving sludge bed, thereby disturbing the sludge flow and preventing the premature formation of a layer of solid material immediately above the conveyor belt strand; and wherein each row of flow breakers is carried by a transversely extending supporting rod which is mounted in the lateral retaining walls;

the supporting rods and associated flow breakers define a transverse pivot axis for the flow breakers at a level above the normal level of the sludge;

the flow breakers are subjected to an angular biasing force urging them into a normal operating position against the movement of the sludge bed on the conveyor; and an extension between at least part of each flow breaker and its supporting rod to provide an offset pivot which contributes to the angular biasing force.

24. A combination as claimed in claim 23 including means for effecting upward swinging of the flow breakers during normal operation in response to impingement of solid matter on the flow breakers to permit the solid matter to move past the flow breakers, the upward swinging means including the transverse pivot axis defined by the supporting rods and associated flow breakers, the flow breakers being swingable about the transverse pivot axis.

25. A combination as defined in claim 24 including means for effecting independent pivoting of each flow breaker about the transverse pivot axis during operation by arranging each flow breaker to pivot about its supporting rod independently of the other flow breakers on the same supporting rod.

26. In a sludge treatment device for extracting liquid from sludge, the combination comprising:

a continuously advancing endless perforate conveyor belt having a substantially horizontally extending belt strand;

guide means for supporting the horizontal conveyor belt strand from underneath, said guide means being pervious to liquid;

means for depositing onto the advancing conveyor belt strand a continuous bed of sludge;

walls for laterally retaining said sludge bed on the advancing conveyor belt strand, as its liquid component progressively passes downwardly through the belt and guide means; and at least two successive rows of downwardly pointing flow breakers arranged above the horizontal conveyor belt strand so as to extend into the moving sludge bed, thereby disturbing the sludge flow and preventing the premature formation of a layer of solid material immediately above the conveyor belt strand; and wherein each row of flow breakers is carried by a transversely extending supporting rod which is mounted in the lateral retaining walls;

the supporting rods and associated flow breakers define a transverse pivot axis for the flow breakers at a level above the normal level of the sludge; and means for angularly biasing the flow breakers, by subjecting them to an angular biasing force urging them into a normal operating position against the movement of the sludge bed on the conveyor to return the flow breakers to a normal operating position after the flow breakers have, during normal operation, been swung upwardly in response to accumulation of solid matter on the flow breakers.

27. A combination as defined in claim 26 including means for effecting upward swinging of the flow breakers during normal operation in response to impingement of solid matter on the flow breakers to permit the solid matter to move past the flow breakers, the upward swinging means including the transverse pivot axis defined by the supporting rods and associated flow breakers, the flow breakers being swingable about the transverse pivot axis.

28. A combination as defined in claim 27 including means for effecting independent pivoting of each flow breaker about the transverse pivot axis during operation by arranging each flow breaker to pivot about its supporting rod independently of the other flow breakers on the same supporting rod.

29. A combination as defined in claim 26, wherein said angular biasing means includes an extension between at least part of each flow breaker and its supporting rod to provide an offset pivot which contributes to the angular biasing force.

30. A combination as defined in claim 26, wherein said angular biasing means includes at least part of each flow breaker being in overhanging relationship with its supporting rod to provide an offset pivot arrangement.

31. In a sewage treatment device for extracting liquid from sewage sludge, the combination comprising:

a continuously advancing endless perforate conveyor belt having a substantially horizontally extending belt strand;

guide means for supporting the horizontal conveyor belt strand from underneath, said guide means being pervious to liquid;

means for depositing onto the advancing conveyor belt strand a continuous bed of sludge;

walls for laterally retaining said sludge bed on the advancing conveyor belt strand, as its liquid component progressively passes downwardly through the belt and guide means; and at least two successive rows of downwardly pointing flow breakers arranged above the horizontal conveyor belt strand so as to extend into the moving sludge bed, thereby disturbing the sludge flow and preventing the premature formation of a layer of solid material immediately above the conveyor belt strand; and wherein each row of flow breakers is carried by a transversely extending supporting rod which is mounted in the lateral retaining walls;

means for effecting upward swinging of the flow breakers during normal operation in response to impingement of solid matter on the flow breakers to permit the solid matter to move past the flow breakers, the upward swinging means including a transverse pivot axis for the flow breakers at a level above the normal level of the sludge and about which the flow breakers are swingable, the transverse pivot axis being defined by the supporting rods and associated flow breakers;

means for angularly biasing the flow breakers, by subjecting them to an angular biasing force urging them into a normal operating position against the movement of the sludge bed on the conveyor to return the flow breakers to a normal operating position after the flow breakers have, during normal operation, been swung upwardly in response to accumulation of solid matter on the flow breakers.

32. A combination as defined in claim 31, including means for effecting independent pivoting of each flow breaker about the transverse pivot axis during operation by arranging each flow breaker to pivot about its supporting rod independently of the other flow breakers on the same supporting rod.

33. A combination as defined in claim 31, wherein said angular biasing means includes an extension between at least part of each flow breaker and its supporting rod to provide an offset pivot which contributes to the angular biasing force.

34. A combination as defined in claim 31, wherein said angular biasing means includes at least part of each flow breaker being in overhanging relationship with its supporting rod to provide an offset pivot arrangement.

35. In a device for extracting liquid from a suspension or sludge, the combination comprising:

a continuously advancing endless perforate conveyor belt having a substantially horizontally extending belt strand;

guide means for supporting the horizontal conveyor belt strand from underneath, said guide means being pervious to liquid;

means for depositing onto the advancing conveyor belt strand a continuous bed of suspension or sludge;

walls for laterally retaining said suspension or sludge bed on the advancing conveyor belt strand, as its liquid component progressively passes downwardly through the belt and guide means;

at least two successive rows of downwardly pointing flow breakers arranged above the horizontal conveyor belt strand so as to extend into the moving sludge bed, thereby disturbing the sludge flow and preventing the premature formation of a layer of solid material immediately above the conveyor belt strand; and means for angularly biasing the flow breakers into a normal operating position against the movement of the sludge bed on the conveyor; and wherein each row of flow breakers is carried by a transversely extending supporting rod which is mounted in the lateral retaining walls, the supporting rod having an upstream and downstream side corresponding with the direction of movement of the sludge bed on the conveyor, the flow breakers all being located on the downstream side of the supporting rod;

the supporting rods and associated flow breakers define a transverse pivot axis for the flow breakers at a level above the normal level of the sludge; and the angular biasing means subjects the flow breakers to an angular biasing force urging them into a normal operating position against the movement of the sludge bed on the conveyor, the angular biasing means including at least part of each flow breaker being in overhanging relationship with its supporting rod to provide an offset pivot arrangement.

36. A combination as defined in claim 35 including means for effecting upward swinging of the flow breakers during normal operation in response to impingement of solid matter on the flow breakers to permit the solid matter to move past the flow breakers, the upward swinging means including the transverse pivot axis defined by the supporting rods and associated flow breakers, the flow breakers being swingable about the transverse pivot axis.

37. A combination as defined in claim 36 including means for effecting independent pivoting of each flow breaker about the transverse pivot axis during operation by arranging each flow breaker to pivot about its supporting rod independently of the other flow breakers on the same supporting rod.

38. In a device for extracting liquid from a suspension or sludge, the combination comprising:
- a continuously advancing endless perforate conveyor belt having a substantially horizontally extending belt strand;
- guide means for supporting the horizontal conveyor belt strand from underneath, said guide means being pervious to liquid;
- means for depositing onto the advancing conveyor belt strand a continuous bed of suspension or sludge;
- walls for laterally retaining said suspension or sludge bed on the advancing conveyor belt strand, as its liquid component progressively passes downwardly through the belt and guide means;
- at least two successive rows of downwardly pointing flow breakers arranged above the horizontal conveyor belt strand so as to extend into the moving sludge bed, thereby disturbing the sludge flow and preventing the premature formation of a layer of solid material immediately above the conveyor belt strand; and
- means for angularly biasing the flow breakers into a normal operating position against the movement of the sludge bed on the conveyor; and wherein
- each row of flow breakers is carried by a transversely extending supporting rod which is mounted in the lateral retaining walls, the supporting rod having an upstream and downstream side corresponding with the direction of movement of the sludge bed on the conveyor, the flow breakers all being located on the downstream side of the supporting rod;
- the supporting rods and associated flow breakers define a transverse pivot axis for the flow breakers at a level above the normal level of the sludge; and
- the angular biasing means subjects the flow breakers to an angular biasing force urging them into a normal operating position against the movement of the sludge bed on the conveyor, the angular biasing means including an extension between at least part of each flow breaker and its supporting rod to provide an offset pivot which contributes to the angular biasing force.

* * * * *